(12) United States Patent
Wild et al.

(10) Patent No.: US 6,735,942 B2
(45) Date of Patent: May 18, 2004

(54) METHOD, COMPUTER PROGRAM, AND CONTROL UNIT FOR OPERATING A VACUUM RESERVOIR PROVIDED IN AN INTERNAL COMBUSTION ENGINE

(75) Inventors: Ernst Wild, Oberriexingen (DE); Kristina Eberle, Hardhof (DE); Lutz Reuschenbach, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/110,299
(22) PCT Filed: Aug. 4, 2001
(86) PCT No.: PCT/DE01/02987
§ 371 (c)(1),
(2), (4) Date: Aug. 9, 2002
(87) PCT Pub. No.: WO02/12041
PCT Pub. Date: Feb. 14, 2002

(65) Prior Publication Data
US 2003/0019473 A1 Jan. 30, 2003

(30) Foreign Application Priority Data
Aug. 10, 2000 (DE) .......................................... 100 38 989

(51) Int. Cl.$^7$ .............................................. F16D 31/02
(52) U.S. Cl. .............................. 60/397; 60/411; 60/418
(58) Field of Search .......................... 60/397, 410, 411, 60/412, 418

(56) References Cited

U.S. PATENT DOCUMENTS

| 5,515,676 A | * | 5/1996 | Earle | .......................... | 60/410 |
| 5,823,637 A | * | 10/1998 | Blue | .......................... | 60/412 |

FOREIGN PATENT DOCUMENTS

| DE | 31 25 923 | 1/1983 |
| DE | 44 44 013 | 6/1995 |
| FR | 2 790 224 | 9/2000 |

* cited by examiner

*Primary Examiner*—Edward K. Look
*Assistant Examiner*—Michael Leslie
(74) *Attorney, Agent, or Firm*—Kenyon & Kenyon (57) ABSTRACT

Described are a method, a computer program, and a control unit for operating a vacuum reservoir provided in an internal combustion engine of a motor vehicle for a servo booster or power-assist unit of the internal combustion engine, which is coupled to an intake manifold of the internal combustion engine and to an electrical suction pump. The pressure prevailing in the vacuum reservoir is determined by a computational model in which quantity flows are fed to the vacuum reservoir when at least one servo unit is actuated, quantity flows are removed from the vacuum reservoir when the pressure prevailing in the intake manifold is lower than the pressure prevailing in the vacuum reservoir, i.e., when the electrical suction pump is switched on. The total pressure prevailing in the vacuum reservoir is calculated from the balance of these flow quantities.

22 Claims, 4 Drawing Sheets

METHOD, COMPUTER PROGRAM, AND CONTROL UNIT FOR OPERATING A VACUUM RESERVOIR PROVIDED IN AN INTERNAL COMBUSTION ENGINE

FIELD OF THE INVENTION

The present invention is directed to a method and a device for operating a vacuum reservoir provided in an internal combustion engine, in particular of a motor vehicle. The vacuum reservoir supplies the auxiliary power, in the form of a vacuum pressure, needed for at least one servo power-assist (one servo booster) unit, and is acted upon by a vacuum pressure prevailing in an intake manifold of the internal combustion engine and in an, in particular, electrical suction pump.

BACKGROUND INFORMATION

German Patent No. 31 25 923, and German Published Application No. 44 44 013 discuss power brake and power steering systems in motor vehicles that draw their auxiliary power from a vacuum reservoir which is coupled to an intake manifold. This intake manifold may be used to supply the internal combustion engine with the air (i.e., the oxygen) that is needed for the combustion. In this context, the intake manifold's vacuum pressure may be stored temporarily in the vacuum reservoir, which may be coupled via a non-return valve to the intake manifold.

Accordingly, to provide adequate servo power assistance, for example servo braking power, a vacuum pressure must have been present for a long enough time in the intake manifold to ensure the proper vacuum pressure in the vacuum reservoir. In response to low manifold pressure, air flows out of the reservoir into the intake manifold. The thus minimally attainable pressure in the vacuum reservoir corresponds to the prevailing manifold pressure. In response to actuation of the brake, the vacuum reservoir is connected via a valve to an actuator which boosts the braking power. In the process, air flows into the vacuum reservoir, thereby increasing the reservoir pressure.

In internal combustion engines of the afore-mentioned type, a throttle valve, which may be used to adjust the air supplied to the combustion chamber, may also be provided in the intake manifold. In conventional internal combustion engines, in particular in the Otto spark-ignition (gas) engine, the throttle valve closes, even when the driver, during braking, removes his/her foot from the accelerator, so that a possibly existing vacuum pressure in the reservoir may be retained. Therefore, in these internal combustion engines, it may be ensured that the vacuum reservoir is able to supply the vacuum pressure required for the servo power-assisted brake even during a relatively long braking action.

However, this is not always ensured in newer internal combustion engines having gasoline direct injection (GDI) or electronic throttle control (e-gas). For example, during the process of heating an existing catalytic converter, the throttle valve may be open to the point where there is no longer an adequate vacuum pressure in the intake manifold. As a result, the vacuum pressure required for the servo system(s) may no longer be able to be made available in the vacuum reservoir.

In addition, in internal combustion engines having GDI or electronic throttle control (e-gas), the throttle valve may be controlled independently of the pedal sensor position, so that the manifold vacuum pressure is restricted in terms of its availability for servo functions.

Examples of this include operating states where manifold injection is accompanied by retarded ignition timing for catalytic converter heating during warm-up. In these operating states, it may be necessary to compensate for a wanted loss of efficiency by opening the throttle valve. This may lead to an increase in the manifold pressure. Stratified operation accompanied by direct injection may be a comparable operating state, where, even at a low load, the throttle valve is fully open, so that, as a result, no manifold vacuum pressure may be available.

In this context, it may also happen during vehicle operation at high altitudes, for example during uphill driving, that the difference relative to the ambient pressure no longer suffices for the servo functions.

The servo power-assisted brake system may be especially critical with respect to safety. If adequate vacuum pressure is not provided, then no brake assistance may be available, or the desired operating state may not be able to run due to safety considerations, thereby leading to deterioration of the exhaust gas or fuel consumption.

A remedy has been discussed in which the throttle opening is designed in such a way that sufficient vacuum pressure is always available. As a result, the throttle opening may not always be able to be optimally designed, in terms of the exhaust gas, for example during the catalyst heating. In addition, in GDI (gasoline direct injection) operated vehicles, a vacuum-operated switch may be used. If the pressure in the brake booster rises above a threshold value, then the switch may be made from stratified operation to homogeneous operation.

In an internal combustion engine, the vehicle may have a built-in suction pump, which compensates for the lacking pressure differential as soon as the pressure in the intake manifold no longer suffices for evacuating the vacuum reservoir. To keep costs low, the suction pump should be a relatively simple component, which is only put into operation in truly necessary cases. Due to cost considerations, the outlay required to detect a necessary switching on or a possible cut off of the suction pump should likewise be kept as low as possible.

It is, therefore, an object of the present invention to provide a method as well as a corresponding device, which, without substantial outlay and with the greatest dependability, will enhance the operational reliability of the vacuum reservoir and minimize mechanical and, thus, also cost expenditures, and at the same time achieving a reliable operation of the vacuum reservoir.

SUMMARY OF THE INVENTION

In an example method according to the present invention, quantity flows are fed to the vacuum reservoir, in a computational model, when at least one servo unit is actuated. Quantity flows are removed from the vacuum reservoir when the pressure prevailing in the intake manifold is lower than the pressure prevailing in the vacuum reservoir. Quantity flows are removed from the vacuum reservoir when the electrical suction pump is switched on. The pressure prevailing is determined in the vacuum reservoir from the balance of the flow quantities fed to and removed from the vacuum reservoir.

According to the present invention, the pressure in the vacuum reservoir, and, therefore, also the vacuum pressure in a servo system, for example in the brake booster are determined by calculation. In this context, the pressure differential in the vacuum reservoir, i.e., in the reservoir of the servo system, is calculated by a model. From the balance of air-inflow and air-outflow quantities to and from the reservoir volume, this model determines the specific pressure in the reservoir.

The compressibility of the gas in the reservoir may be considered in a state equation for ideal gases. The flow quantity into the reservoir may be calculated from the difference between the reservoir pressure and the intake manifold pressure and between the reservoir pressure and the minimal suction pump pressure, allowing for the resistances to flow in the lines to the reservoir. Flow quantities flowing out of the reservoir may be determined from the driving states, e.g., cornering, with the power steering system being loaded to this effect, or a vehicle deceleration, with the power brake system being loaded to this effect.

In internal combustion engines, certain output variables may already be known from such a motor control. In anti-lock braking systems (ABS), for example, motor control interfaces are already present which transmit information on the air consumption in the servo brake to the engine management system. Information on intake manifold pressure, ambient pressure, change in vehicle speed, and the operating state of the suction pump is also usually available in conventional engine management systems. The additionally required sensors, such as pressure switches or pressure boost sensors in the pressure reservoir (accumulator), are likewise present in existing systems. Thus, in an implementation of the method according to the present invention, no additional construction measures may be necessary in existing internal combustion engines. In accordance with one embodiment of the present invention, the required differential pressure is compared to the available differential pressure. If there is not sufficient differential pressure available, either the suction pump is turned on or the engine operating state is altered. In the case of a change in the operating state, such a state, accompanied by elevated intake-manifold vacuum pressure, may be adjusted in that the engine control reduces the throttle-valve opening.

In a further refinement of the example embodiment of the present invention, an additional throttling takes place in stratified operation. In the case of catalyst heating using a retarded ignition timing, an ignition timing that is optimal for efficiency is given priority over the catalytic converter heating. As a result, the engine requires less air-mass flow, the throttle valve may be closed, and the intake-manifold pressure decreases.

The changes in the operating state having elevated intake-manifold vacuum pressure may be made furthermore by intervening in the power efficiency specifications or in the operating state specifications of the engine management. In the case of engine management, direct interventions in the ignition timing are also possible without necessitating computational modeling of the efficiency or the operating state.

In engine management concepts for optimizing consumption and exhaust-emission behavior, operating states associated with high intake-manifold pressure occur. To respond to insufficient vacuum pressure in the servo system, the example method provides for either turning on the suction pump and/or altering the operating state to ensure sufficient vacuum pressure in the servo system. In this context, the example method eliminates the need, in particular, for the pressure sensor at the vacuum reservoir or, given the existence of a pressure sensor, eliminates the need for monitoring the sensor for correct functioning.

Another method according to the present invention provides for the quantity flows fed to the vacuum reservoir and/or the quantity flows removed from the vacuum reservoir to be continually summed using the appropriate operational sign, or integrated. The contents of the vacuum reservoir are thus able to be continually and dynamically adapted to the quantity flows existing at any one time and, on the basis of the contents, the pressure prevailing in the reservoir may be predicted at any point in time. In this connection, the quantity flows in question may either be summed as discrete air volumes or be integrated as infinitesimal air-volume variations.

The method according to the present invention may additionally provide that flow quantities be removed from the vacuum reservoir only when the difference between the pressure prevailing in the intake manifold or suction pump and the pressure prevailing in the vacuum reservoir exceeds a predefined threshold value. A non-return valve may be installed between the vacuum reservoir and the intake manifold. This may likewise be considered in conjunction with the proposed threshold value in the model calculation according to the present invention. In this context, the threshold value may be adapted to the particular physical conditions and, thus, may be used as an additional parameter for optimizing the proposed model. Moreover, pressure losses which may-occur due to flow resistance in the line may be considered on the basis of the parameter.

The model calculation in accordance with the present invention may also provide for calculating the quantity flows fed to the vacuum reservoir and/or the quantity flows removed from the vacuum reservoir from operating states of the internal combustion engine, in particular from driving states of the motor vehicle. On the one hand, the pressure prevailing in the intake manifold may depend on the operating states of the internal combustion engine, in so far as the air supplied by the intake manifold to the combustion chamber may depend on the current state of combustion. On the other hand, the air supplied to the intake manifold, for example via the throttle valve, may be controllable. In the case of a motor vehicle, parameters such as vehicular speed or braking deceleration may be consulted. From these, inferences may then be made, in particular, with respect to the air masses supplied via a brake booster to the vacuum reservoir.

In accordance with another embodiment of the method of the present invention, the quantity flows fed to the vacuum reservoir may be calculated using a step function that is triggered by a signal edge representing the servo function response. This measure may be consistent with technical considerations. In the case of a brake booster, for example, when a corresponding braking force is applied to the brake booster in response to a braking maneuver, the quantity flows fed to the vacuum reservoir correspond approximately to a step function having a more or less constant time duration per braking intervention. In this context, the step function may be modeled, in particular, in the form of a monoflop.

Based on the modeling of the pressure in the vacuum reservoir in accordance with the present invention, as a function of the pressure prevailing in the vacuum reservoir, and as calculated from the balance of the flow quantities, an intervention may be made in the internal combustion engine to lower the pressure in the vacuum reservoir. In particular, a throttle valve may be provided in the intake manifold which may be adjusted, and/or the suction pump may be turned on. As a result of this intervention, therefore, the vacuum pressure required for the servo system is again automatically made available in response to the exceeding of a pressure threshold, without the need for any intervention or interaction on the part of the driver. Thus, according to this embodiment, an appropriate vacuum pressure may be assured at all times.

Alternatively or additionally thereto, as a function of the pressure prevailing in the vacuum reservoir, and as calculated from the balance of flow quantities, an appropriate flag (indicator) may be set. In particular, a control or warning signal may be output. Thus, in this exemplary embodiment, an intervention in the internal combustion engine is not necessarily automatically made to lower the pressure in the vacuum reservoir. Rather, an appropriate bit is initially set which is subsequently able to trip a corresponding control or warning signal. This enables the driver to initiate the necessary countermeasures on his/her own accord, or he/she is at least informed about the initiated measures.

In accordance with another exemplary embodiment of the method according to the present invention, the calculated pressure prevailing in the vacuum reservoir may be used for monitoring a pressure sensor for correct functioning. In this connection, the model-based calculation of the pressure prevailing in the vacuum reservoir may be used as a further safety feature for an internal combustion engine of the species and, thus, makes it possible to detect a malfunction of an already existing pressure sensor.

It is emphasized here that, of the various servo functions provided in a motor vehicle—as far as maximum driving safety is concerned—the brake servo (booster) function may be given precedence over the other servo functions. Thus, in accordance with one further refinement of the inventive idea, in the case of insufficient vacuum pressure in the vacuum reservoir, functions such as servo (power) steering or resonance throttle control may be temporarily deactivated, in order to at least ensure an adequate brake servo function. This may be important, for example, when the user demands braking force to such a degree (for example by pumping the brake pedal) that even the electrical suction pump is not able to evacuate quickly enough the air volume from the vacuum reservoir required for this.

The assumption may also be made in a first approximation, when modeling the mass flows flowing into and out of the vacuum reservoir, that the sum of the inflowing and outflowing air flows is constant. Furthermore, in choosing the dimensions of the integrator/summator of the inflowing and outflowing mass flows, as a lower limit one may assume the pressure prevailing in the intake manifold or in the suction pump, and as an upper limit one may assume the ambient pressure.

The present invention is also directed to a computer program which is suited for implementing the above-described method when it is carried out on a computer. In this context, the computer program may be stored in a memory, in particular in a flash memory.

The control unit provided in accordance with the present invention for an internal combustion engine may include means for detecting the actuation of at least one servo function, means for sensing the pressure prevailing in the intake manifold, means for sensing the operating state of the suction pump, and means for calculating the pressure prevailing in the vacuum reservoir. The control unit may provide for quantity flows to be fed to the vacuum reservoir when at least one servo function responds, for quantity flows to be removed from the vacuum reservoir when the pressure prevailing in the intake manifold is less than the pressure prevailing in the vacuum reservoir, and for the pressure prevailing in the vacuum reservoir to be calculated from the balance of flow quantities fed to and removed from the vacuum reservoir. Data-acquisition means are provided and may include a switch or a sensor for detecting the actuation of at least one servo function, a stop-light or brake-light switch for detecting a brake actuation, means for sensing the intake manifold pressure required for the model calculation, and means for sensing the operating state of the suction pump. Means are provided, moreover, for processing this acquired information on the basis of the proposed model.

DETAILED DESCRIPTION

Figure 1:
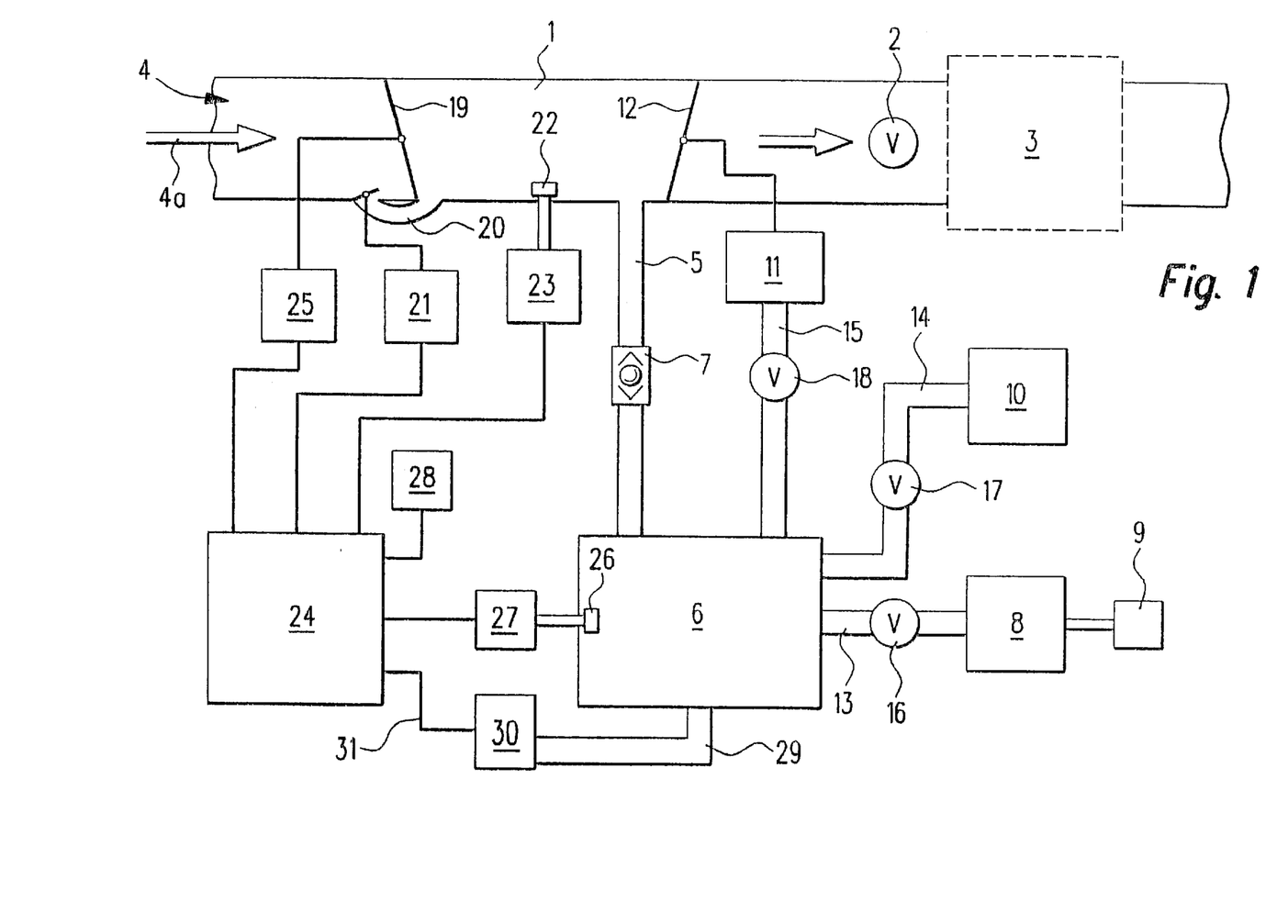
FIG. 1 is a block diagram of a motor-vehicle internal combustion engine according to the present invention.

The internal combustion engine shown in FIG. 1 has an intake manifold 1, which is coupled via valves 2 to a combustion chamber 3 of the internal combustion engine. Air is supplied to the intake manifold via an opening 4. Via a line 5, intake manifold communicates in a pressure-conductive manner with a vacuum reservoir 6. A non-return valve 7 is configured within this line path. Servo devices of the motor vehicle, which are installed in the existing internal combustion engine, communicate in particular, in pressure-conductive manner (via pressure-media lines) with vacuum reservoir 6. Provided as servo systems in the present exemplary embodiment are a brake booster 8, which communicates in a pressure-conductive manner via a master brake cylinder (not shown) with a brake pedal 9, as well as a servo power steering system 10 and a resonance throttle control 11. The latter supplies the auxiliary power necessary for operating a resonance valve 12. These servo systems communicate in a pressure conductive manner via lines 13, 14, 15 with vacuum reservoir 6.

Also provided in pressure lines 13, 14, 15 are valves 16, 17, 18, by way of which, only as needed, the individual servo systems may be coupled in a pressure-conductive manner to the vacuum reservoir. Air flows in line 5 between intake manifold 1 and vacuum reservoir 6, in one of the two directions, depending on whether the pressure in the intake manifold is lower or higher than that in vacuum reservoir 6. The already mentioned non-return valve 7 assures, in particular, that the air flow is avoided in the direction of the vacuum reservoir, so that vacuum reservoir 6 is not flooded with air as soon as a higher pressure prevails in intake manifold 1 than in vacuum reservoir 6.

Also provided in intake manifold 1, in the vicinity of opening 4, is a throttle valve 19, which is used for controlling and/or regulating air flow 4a flowing into the intake manifold. Additional bypass line 20 makes it possible to ensure that sufficient air is supplied to the intake manifold during idle operation of the internal combustion engine. In this context, bypass line 20 is controlled in open and/or closed loop via an idle actuator 21.

Also provided on the intake manifold is a pressure sensor 22 for measuring the pressure prevailing in the intake manifold. The signal supplied from pressure sensor 22 may first be fed to an intake-manifold pressure sensor electronics 23 or, however, be directly transmitted to an electronic control unit 24.

In comparable fashion, the output signal from idle actuator 21 is fed to electronic control unit 24. In addition, the position of throttle valve 19 is determined via a throttle-valve potentiometer 25, and the corresponding measurement signal is likewise fed to electronic control unit 24.

As further pressure information, the pressure prevailing in vacuum reservoir 6 is supplied, first of all, by a pressure sensor 26, via a possibly existing pressure-sensor electronics 27, to control unit 24. The ambient pressure required for the computational model according to the present invention (see FIGS. 2 through 4) is ultimately communicated by an ambient-pressure sensor 28 to control unit 24.

Vacuum reservoir 6 is coupled in fluid communication via a line 29 to a suction pump 30, which, in turn, is driven via a line 31 by control unit 24 and transmits signals indicative of its operating state to this control unit.

Figure 2:
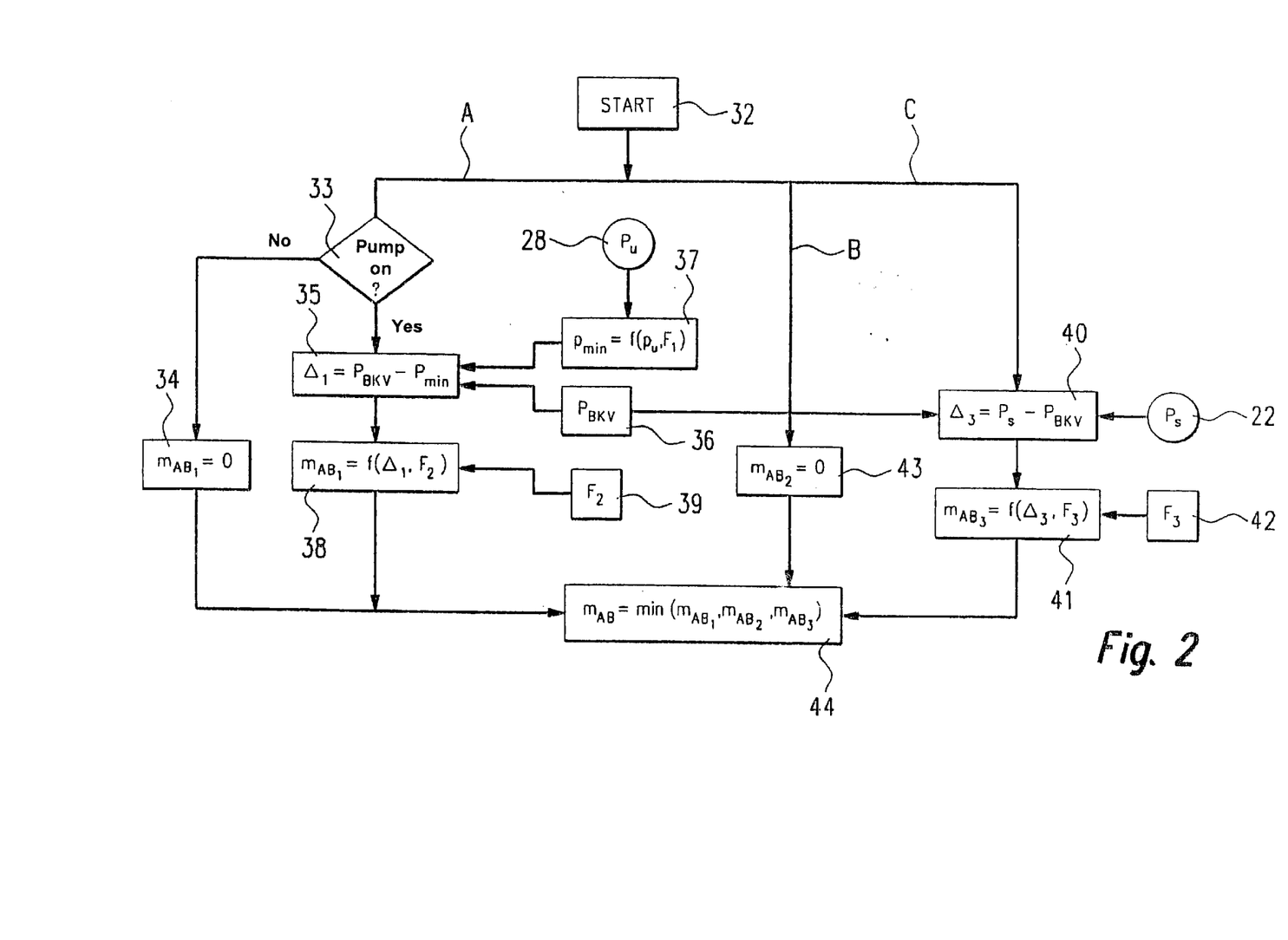
FIG. 2 is a flow chart of a first section of an exemplary embodiment of a method according to the present invention.
Figure 3:
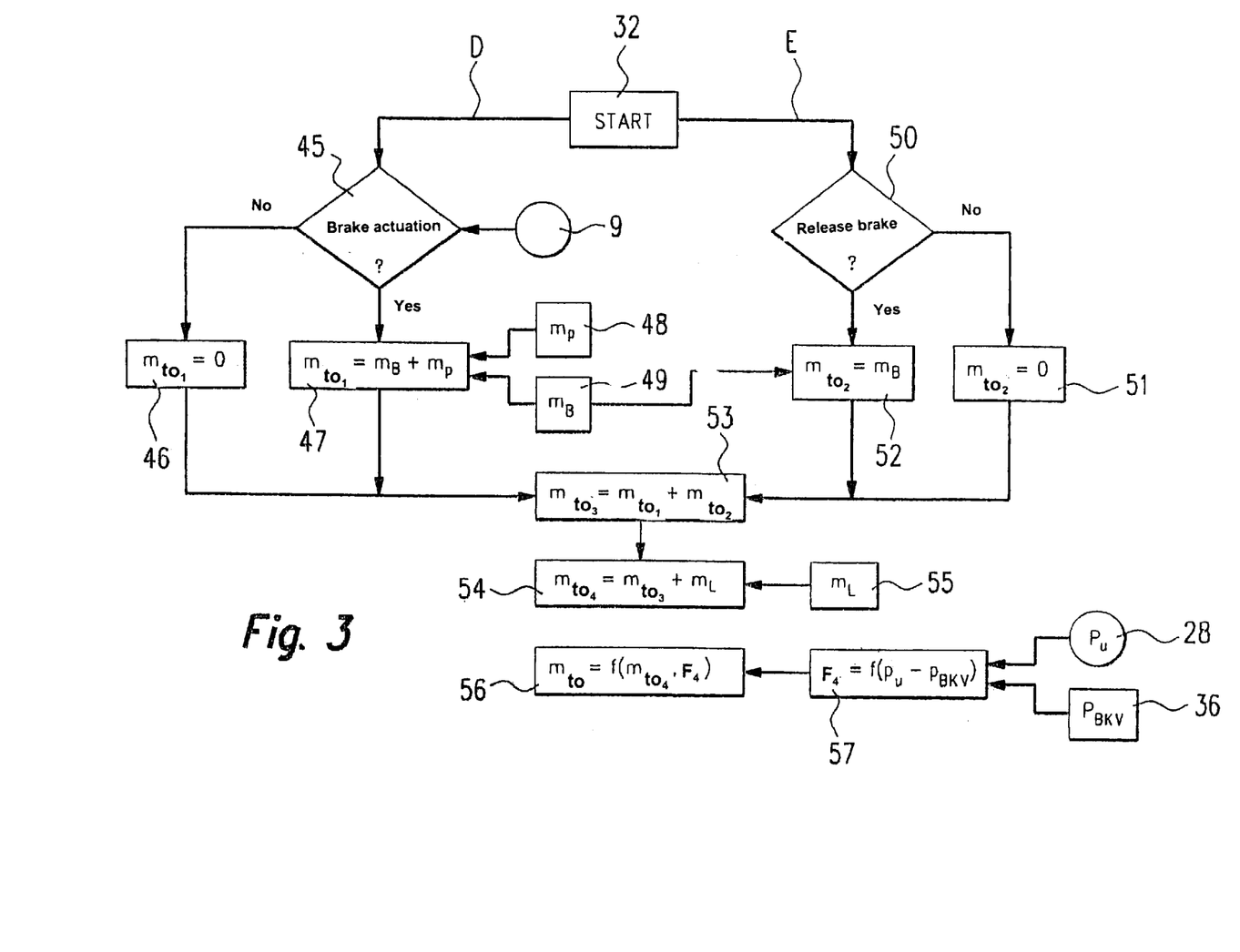
FIG. 3 is a flow chart of a second section of the exemplary embodiment of the method according to the present invention.
Figure 4:
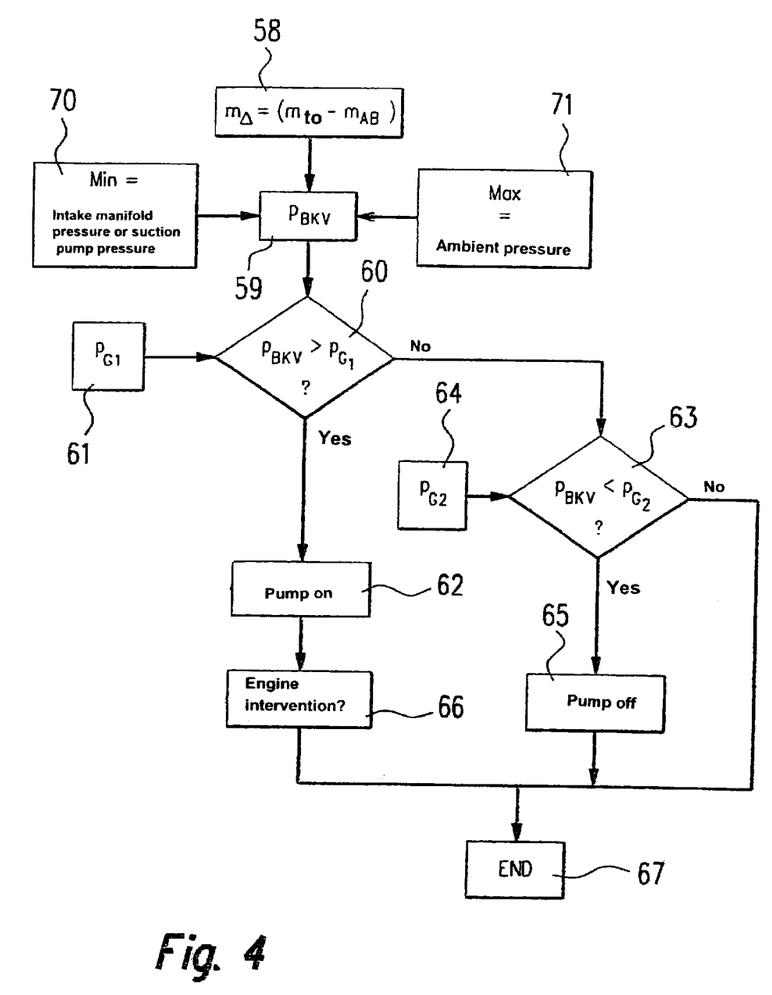
FIG. 4 is a flow chart of a third section of the exemplary embodiment of the method according to the present invention.

FIGS. 2 through 4 show a method sequence, in accordance with which, the vacuum pressure prevailing in vacuum reservoir 6 is determined using an appropriate model. The flow chart illustrated in FIG. 2 relates to the ascertainment of the quantity flows removed from vacuum reservoir 6 and begins with a starting block 32. After that, the section of the method depicted in FIG. 2 subdivides into three branches A, B, and C.

In the left branch A in FIG. 2, the query is initially made in block 33 as to whether electrical suction pump 30 is turned on. When the pump is turned off, a value $m_{ab1}$ for the air evacuated from vacuum reservoir 6 is set to zero in block 34.

If the pump is turned on, the difference $\Delta_1$ between pressure $P_{BKV}$ prevailing in vacuum reservoir 6 and the minimally attainable pressure $P_{min}$ from electrical suction pump 30 is calculated in block 35. Pressure $P_{BKV}$ prevailing in vacuum reservoir 6 is extracted from memory 36, in which the pressure calculated during a preceding loop and prevailing in vacuum reservoir 6 is stored. Pressure $P_{min}$ that is minimally attainable from electrical suction pump 30 is calculated in block 37. There, a factor $F_1$ is applied to ambient pressure $P_U$ supplied by ambient pressure sensor 28. This allows for the fact that electrical suction pump 30 is only able to provide a specific pressure difference in comparison with ambient pressure $P_U$.

A value $m_{ab1}$ for the air volume that is able to be evacuated by electrical suction pump 30 from vacuum reservoir 6 is calculated in block 38 by applying a factor $F_2$ to difference $\Delta_1$. Factor $F_2$ is stored in a memory 39 and represents a weighting factor which may be used to allow for the influence of electrical suction pump 30 on the entire system.

In the right branch C of the flow chart in FIG. 2, the air volume, which may be evacuated into intake manifold 1 of the internal combustion engine, is calculated. For this, difference $\Delta_3$ between pressure $p_S$ prevailing in intake manifold 1 and pressure $P_{BKV}$ prevailing in vacuum reservoir 6 is initially calculated in block 40. The pressure in intake manifold 1 is supplied by pressure sensor 22; pressure $P_{BKV}$ in vacuum reservoir 6 is retrieved from memory 36, as described above with respect to left branch A. In block 41, a weighting factor $F_3$, which is stored in a memory 42 and through which the influence of intake manifold 1 on the entire system may be considered, is applied to difference $\Delta_3$. The result of the operation performed in block 41 is a value $m_{ab3}$ for the air volume evacuated from vacuum reservoir 6 into intake manifold 1.

In middle branch B, a value $m_{ab2}$ is set to zero (block 43). The purpose of this measure is explained below.

From the three values $m_{ab1}$, $m_{ab2}$ and $m_{ab3}$, the minimal value is generated in block 44. Under normal circumstances, i.e., when minimally attainable pressure $P_{min}$ from electrical suction pump 30 and/or pressure $p_S$ in intake manifold 1 are lower than pressure $P_{BKV}$ in vacuum reservoir 6, values $m_{ab1}$ and $m_{ab3}$, respectively, are negative values. In rare cases, it can occur, however, that pressure $P_{BKV}$ is less than pressure $P_S$ prevailing in intake manifold 1 or than pressure $P_{min}$ that is attainable by electrical suction pump 30. This can be the case, for example, during uphill travel of a motor vehicle, when the vehicle has to overcome a substantial altitude difference. In such a case, air would flow into vacuum reservoir 6 and "fill" it up again, which, of course, is undesirable and is prevented by non-return valve 7. The influence of the non-return valve in such a case is taken into account in that, in block 43, a value $m_{ab2}$ is set to zero, which, in this rare case, is used as a minimal value in block 44.

A second section of the method for operating vacuum reservoir 6 is shown in FIG. 3, in which the supplied quantity flows of the model are ascertained and which likewise begins with start block 32 and divides into two branches D and E. In left branch D in FIG. 3, it is queried in block 45 whether brake booster 8 was actuated via brake pedal 9. In this context, an actuation is understood to be a dynamic process where the brake is brought from a released state into an actuated state. Remaining in the actuated stationary state would signify the query result "no" in decision block 45. In this case or in the case where the brake remains in a stationary, released state, a value for air volume $m_{to1}$ flowing to vacuum reservoir 6 from brake booster 8 is set to equal zero. Alternatively, in block 47, air volume $m_{to1}$ is calculated from the sum of two values $m_B$ and $m_P$, which are stored in memories 48 and 49. In this context, value $m_B$ stands for that air volume which flows from brake booster 8 into vacuum reservoir 6 in response to a dynamic actuation of the brake. Value $m_P$ takes into account that, during a braking operation, the brake power often changes, so that additional air flows from brake booster 8 into vacuum reservoir 6. Such a process is also described as "pumping".

In the right branch E of the flow chart in FIG. 3, it is queried in block 50 whether the brake is released. Analogously to the explanations regarding block 45, here a releasing of the brake signifies that the brake passes dynamically from an actuated to a released state.

If the brake, i.e., brake pedal 9 and brake booster 8, remains in a stationary, released state, the response in decision block 50 is "no". In this case, no air flows from brake booster 8 to vacuum reservoir 6. This is taken into account in block 51 in that an air volume $m_{to2}$ is set to zero.

If the response in decision block 50 is "yes", in block 52, air volume $m_{to2}$ flowing to vacuum reservoir 6 is set to equal value $m_B$ stored in memory 49.

From the values $m_{to1}$ and $m_{to2}$, the sum $m_{to3}$ is generated in block 53. To this is added, in block 54, a value $M_L$ which is stored in a memory 55. The thus calculated value $m_{to4}$ takes into account a base leakage, corresponding to value $M_L$, that is assumed for the system.

The air volume $m_{to}$ ultimately flowing to vacuum reservoir 6 is calculated in block 56, in that a factor $F_4$ is applied to value $m_{to4}$. This factor $F_4$ takes into account that air volume $m_{to}$ flowing into vacuum reservoir 6 in response to a brake actuation by brake booster 8, and also base leakage $m_L$, are dependent upon the pressure differential between ambient pressure $P_U$ and pressure $P_{BKV}$ prevailing in vacuum reservoir 6. Factor $F_4$ is calculated in block 57 on the basis of this pressure differential.

Reference is made at this point to the method section illustrated in FIG. 4, where a balancing of flow quantities is undertaken for the model:

In block 58, the difference is calculated between value $m_{to}$ determined in FIG. 3 and value $m_{ab}$ determined in FIG. 2, thus a balancing of flow quantities is undertaken using the appropriate operational signs. From this, taking into consideration the ideal gas equation and the volume of vacuum reservoir 6, pressure $P_{BKV}$ prevailing in vacuum reservoir 6 is calculated in subsequent block 59, using continuous integration. This is compared in block 70 to a minimum value, namely to the intake manifold pressure during idle running of the internal combustion engine or to the minimum pressure of the electrical suction pump, and set to equal this value, provided that this minimum value is fallen short of (not met) due to the integration. Analogously hereto, a comparison to a maximum value, namely to the ambient pressure, is made in block 71, and the pressure in the vacuum reservoir is set to equal this maximum value, when this value is exceeded by the calculated value.

On the basis of this calculated pressure $P_{BKV}$ stored in vacuum reservoir 6, it is now determined whether measures need to be introduced to lower pressure $p_S$ in intake manifold 1, or whether electrical suction pump 30 needs to be switched on. For this, value $P_{BKV}$ in block 60 is compared to a limiting value $P_{G1}$ which is stored in a limit value memory 61. A "yes" response in block 60 (thus, if there is not enough vacuum pressure in vacuum reservoir 6) prompts control unit 24 to switch on electrical suction pump 30 in block 62. An alarm signal may also be optionally output, e.g., a warning light lit up in the motor vehicle dashboard.

If the response in block 60 is "no", which is synonymous with a pressure in vacuum reservoir 6 corresponding at least to desired setpoint $P_{G1}$, it is checked in block 63 whether pressure $P_{BKV}$ prevailing in vacuum reservoir 64 is less than a limiting value $P_{G2}$ which is stored in a limit value memory 64. A "yes" response in block 63 prompts control unit 24 to switch off electrical suction pump 30 in block 65. In this context, limiting value $P_{G2}$ is less than value $p_1$, in order to maintain a hysteresis among the conditions which justify switching electrical suction pump 30 on or off. The hysteresis prevents a "bouncing" (fluttering) of electrical suction pump 30, as on and off commands are output to electrical suction pump 30 in rapid succession.

If the suction capacity of electrical suction pump 30 does not suffice to establish the required pressure $P_{G1}$ in vacuum reservoir 6 within a specific time period, this is determined in block 66 and, if indicated, a measure is introduced to lower the pressure in intake manifold 1. This includes, for example, adjusting throttle valve 19. If indicated, the outputting of an alarm may also be initiated. By placing block 66 behind block 62, priority is given to the switching on of electrical suction pump 30, over an engine intervention. This has the advantage, particularly when working with GDI engines and e-gas systems, that the engine is able to be operated in the optimal working range for low fuel consumption and low exhaust-gas emission.

The loop ends in block 67. From there, if indicated, a return to start block 32 may follow. In this context, the return may follow, for example, cyclically at a specific clock-pulse rate, or as an event-driven return.

What is claimed is:

1. A method for operating a vacuum reservoir provided in an internal combustion engine, the vacuum reservoir supplying auxiliary power, in a form of a vacuum pressure, needed for at least one servo unit, the vacuum reservoir being acted upon by a vacuum pressure prevailing in an intake manifold of the internal combustion engine and an electrical suction pump, the method comprising modeling including:

feeding at least one first flow quantity to the vacuum reservoir when the at least one servo unit is actuated;

removing at least one second flow quantity from the vacuum reservoir when a first prevailing pressure in the intake manifold of the internal combustion engine is lower than a second prevailing pressure in the vacuum reservoir;

removing at least one third flow quantity from the vacuum reservoir when the electrical suction pump is switched on; and determining the second prevailing pressure from a balance of the at least one first flow quantity, the at least one second flow quantity, and the at least one third flow quantity.

2. The method as recited in claim 1, wherein the internal combustion engine is in a motor vehicle.

3. The method as recited in claim 1, further comprising at least one of:

summing continually at least one of the at least one first flow quantity, the at least one second flow quantity, and the at least one third flow quantity using an appropriate operational sign; and integrating continually at least one of the at least one first flow quantity, the at least one second flow quantity, and the at least one third flow quantity.

4. The method as recited in claim 1, wherein the removing the at least one second flow quantity is conducted only when a difference between the first prevailing pressure in the intake manifold and the second prevailing pressure in the vacuum reservoir exceeds a predefined threshold value.

5. The method as recited in claim 1, further comprising:

determining at least one of the at least one first flow quantity, the at least one second flow quantity, and the at least one third flow quantity from at least one operating state of the internal combustion engine.

6. The method as recited in claim 5, wherein the at least one operating state of the internal combustion engine includes at least one driving state of a motor vehicle.

7. The method as recited in claim 1, further comprising:

determining the at least one first flow quantity using a step function that is triggered by a signal edge representing a response of the at least one servo unit.

8. The method as recited in claim 1, further comprising:

intervening in the internal combustion engine to lower the second prevailing pressure as a function of the second prevailing pressure as determined from the balance of the at least one first flow quantity, the at least one second flow quantity, and the at least one third flow quantity.

9. The method as recited in claim 8, wherein the intervening includes at least one of:

turning on the electrical suction pump; and adjusting a throttle valve.

10. The method as recited in claim 9, wherein the throttle valve is provided in the intake manifold.

11. The method as recited in claim 9, wherein priority is given to turning on the electrical suction pump over an engine intervention.

12. The method as recited in claim 1, further comprising:

monitoring a pressure sensor for correct functioning using the determined second prevailing pressure.

13. A computer readable medium encoded with a computer program suited for causing a computer to implement a method for operating a vacuum reservoir provided in an internal combustion engine when the computer program is executed on a computer, the vacuum reservoir supplying auxiliary power, in a form of a first vacuum pressure, needed for at least one servo unit, the vacuum reservoir being acted upon by a second vacuum pressure prevailing in an intake manifold and an electrical suction pump, the method comprising modeling including:

feeding at least one first flow quantity to the vacuum reservoir when the at least one servo unit is actuated;

removing at least one second flow quantity from the vacuum reservoir when a first prevailing pressure in the intake manifold of the internal combustion engine is lower than a second prevailing pressure in the vacuum reservoir;

removing at least one third flow quantity from the vacuum reservoir when the electrical suction pump is switched on; and determining the second prevailing pressure from a balance of the at least one first flow quantity, the at least one second flow quantity, and the at least one third flow quantity.

14. The computer readable medium as recited in claim 13, wherein the medium is a flash memory.

15. A control unit for an internal combustion engine in which a vacuum reservoir is provided, the vacuum reservoir supplying auxiliary power, in a form of a first vacuum pressure, needed for at least one servo function, the vacuum reservoir being acted upon by a second vacuum pressure prevailing in an intake manifold and a suction pump, the control unit comprising:

a first arrangement configured to detect an actuation of the at least one servo function of the internal combustion engine;

an arrangement configured to sense a first prevailing pressure in an intake manifold of the internal combustion engine;

an third arrangement configured to detect an operating state of a suction pump; and a fourth arrangement configured to determine a second prevailing pressure in the vacuum reservoir from a balance of at least one first flow quantity, at least one second flow quantity, and at least one third flow quantity, the at least one first flow quantity fed to the vacuum reservoir when the at least one servo function responds, the at least one second flow quantity removed from the vacuum reservoir when the first prevailing pressure is lower than the second prevailing pressure, the at least one third flow quantity removed from the vacuum reservoir when the suction pump is switched on.

16. The control unit as recited in claim 15, wherein the internal combustion engine is in a motor vehicle.

17. The control unit as recited in claim 15, further comprising at least one of:

a summator which continually sums at least one of the at least one first flow quantity, the at least one second flow quantity, and the at least one third flow quantity; and an integrator which continually integrates at least one of the at least one first flow quantity, the at least one second flow quantity, and the at least one third flow quantity.

18. The control unit as recited in claim 15, further comprising:

a fifth arrangement configured to detect a signal edge representing a response of the at least one servo function; and a sixth arrangement configured to detect the at least one first flow quantity based on a step function.

19. The control unit as recited in claim 15, further comprising at least one of:

a fifth arrangement configured to switch on the suction pump; and a sixth arrangement configured to intervene in the internal combustion engine to lower the second prevailing pressure in the vacuum reservoir.

20. The control unit as recited in claim 19, wherein the fifth arrangement includes a sixth arrangement configured to adjust a throttle valve as a function of the second prevailing pressure as determined from the balance.

21. The control unit as recited in claim 20, wherein the throttle valve is provided in the intake manifold.

22. The control unit as recited in claim 15, further comprising:

a fifth arrangement configured to monitor a pressure sensor for correct functioning on a basis of the second prevailing pressure as determined from the balance.

* * * * *